US010055313B2

(12) United States Patent
Deng et al.

(10) Patent No.: US 10,055,313 B2
(45) Date of Patent: *Aug. 21, 2018

(54) METHOD AND SYSTEM FOR SESSION DISASTER RECOVERY

(71) Applicant: Alibaba Group Holding Limited, George Town (KY)

(72) Inventors: Minhui Deng, Hangzhou (CN); Kunli Luo, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/267,443

(22) Filed: Sep. 16, 2016

(65) Prior Publication Data

US 2017/0004053 A1 Jan. 5, 2017

Related U.S. Application Data

(63) Continuation of application No. 14/662,905, filed on Mar. 19, 2015, now Pat. No. 9,477,556.

(30) Foreign Application Priority Data

Mar. 26, 2014 (CN) .......................... 2014 1 0116909

(51) Int. Cl.
*G06F 11/00* (2006.01)
*G06F 11/14* (2006.01)
(Continued)

(52) U.S. Cl.
CPC ...... *G06F 11/1471* (2013.01); *G06F 11/0754* (2013.01); *G06F 11/1443* (2013.01);
(Continued)

(58) Field of Classification Search
USPC ......................................................... 714/15
See application file for complete search history.

(56) References Cited

U.S. PATENT DOCUMENTS 7,085,958 B2 * 8/2006 El-Batal ................. G11C 29/02
714/6.13
7,155,120 B1 * 12/2006 Ofek ................... H04J 14/0227
370/216
(Continued)

FOREIGN PATENT DOCUMENTS

| CN | 202143095 | 2/2012 |
|----|-----------|--------|
| CN | 102769626 | 11/2015 |
| CN | 103327036 | 12/2016 |

*Primary Examiner* — Sarai E Butler
(74) *Attorney, Agent, or Firm* — Van Pelt, Yi & James LLP

(57) ABSTRACT

Embodiments of the present application relate to a method, a system, and a computer program product. A method is provided and includes in the event that a check trigger condition is satisfied for a disaster recovery intervention rule in a disaster recovery intervention rule base, automatically checking whether an intervention is to be performed for a session storage medium determined by a session configuration information already loaded in a session configuration file, the checking being performed based on the satisfied disaster recovery intervention rule, in the event that the intervention is determined to be performed, determining a next session storage medium corresponding to the session storage medium requiring intervention, and loading configuration information corresponding to the next session storage medium into the session configuration file to switch the configuration information corresponding to the session storage medium requiring intervention to the configuration information corresponding to the next session storage medium.

15 Claims, 6 Drawing Sheets

(51) Int. Cl.
*G06F 11/20* (2006.01)
*G06F 11/30* (2006.01)
*H04L 29/14* (2006.01)
*H04L 29/08* (2006.01)
*H04L 12/24* (2006.01)
*H04L 12/26* (2006.01)
*G06F 11/07* (2006.01)

(52) U.S. Cl.
CPC ...... *G06F 11/1451* (2013.01); *G06F 11/1464* (2013.01); *G06F 11/1469* (2013.01); *G06F 11/2033* (2013.01); *G06F 11/2094* (2013.01); *G06F 11/3037* (2013.01); *H04L 41/0659* (2013.01); *H04L 41/0853* (2013.01); *H04L 43/0823* (2013.01); *H04L 43/10* (2013.01); *H04L 67/142* (2013.01); *H04L 69/40* (2013.01); *G06F 11/0727* (2013.01); *G06F 11/0757* (2013.01); *G06F 2201/805* (2013.01); *G06F 2201/82* (2013.01)

(56) References Cited

U.S. PATENT DOCUMENTS

| | | |
|---|---|---|
| 8,228,787 B2 | 7/2012 | Liang |
| 8,243,588 B2 | 8/2012 | Naseh |
| 2006/0183469 A1 | 8/2006 | Gadson |
| 2006/0248198 A1 | 11/2006 | Galchev |
| 2007/0226532 A1* | 9/2007 | Matsuda ............ G06F 11/0709 714/4.1 |
| 2013/0238799 A1 | 9/2013 | Osamura |
| 2014/0059003 A1 | 2/2014 | Blea |

* cited by examiner

100

200

2000

300

METHOD AND SYSTEM FOR SESSION DISASTER RECOVERY

CROSS REFERENCE TO OTHER APPLICATIONS

This application is a continuation of co-pending U.S. patent application Ser. No. 14/662,905, entitled METHOD AND SYSTEM FOR SESSION DISASTER RECOVERY filed Mar.19, 2015 which is incorporated herein by reference for all purposes, which claims priority to People's Republic of China Patent Application No. 201410116909.3 entitled A METHOD AND A DEVICE FOR SESSION DISASTER RECOVERY, filed Mar. 26, 2014 which is incorporated herein by reference for all purposes.

FIELD OF THE INVENTION

The present application relates to a method and a system for session disaster recovery.

BACKGROUND OF THE INVENTION

Session data typically refers to relevant session data in a process beginning with entry into a system and ending with exit from the system. For example, HTTP session information is exchanged between a client and a server when a user logs onto the server from the client to execute certain transactions.

Commonly used types of storage media where session data is stored include cookie storage, memory storage, cache storage, and persistent storage. Client applications typically designate a session storage medium type, as well as a storage address, form of encryption/decryption, etc. corresponding to the session storage medium type in session configuration information of the client applications. The client applications utilize an access strategy corresponding to their own session configuration information to access (e.g., read/write access) session data. For example, in an exchange process between a user via a client application (e.g., a browser) and a server, the client application accesses the session data (e.g., login information, transaction information, etc.) relating to the session storage medium determined by the session configuration information and completes the exchange process. However, if an abnormal condition occurs in any of the above types of storage media (cookie storage, memory storage, cache storage, or persistent storage), in order to cope with storage media abnormalities, the storage medium itself typically provides a disaster recovery mechanism for handling the abnormalities to ensure that the client application maintains stable access to the session data relating to the session storage medium determined by the session configuration information.

However, when the disaster recovery mechanism provided by the session storage medium is unable to successfully handle an abnormality, a session data access failure for the client occurs.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

When a user browses a web page via a web page browser, a process is used to monitor a session storage medium determined by the session configuration information in a session configuration file when the web page browser begins to load the web page until the web page browser exits from the web page. When an abnormality occurs, the session access application dynamically loads session configuration information to cause the configuration information corresponding to the abnormal session storage medium to switch to configuration information corresponding to a normal session storage medium, thereby ensuring that the web page browser continues to access the relevant session data (e.g., login information, transaction information, etc.) of the process in a stable manner. For example, the session access application is used to ensure that the web page browser accesses normal content.

Figure 1:
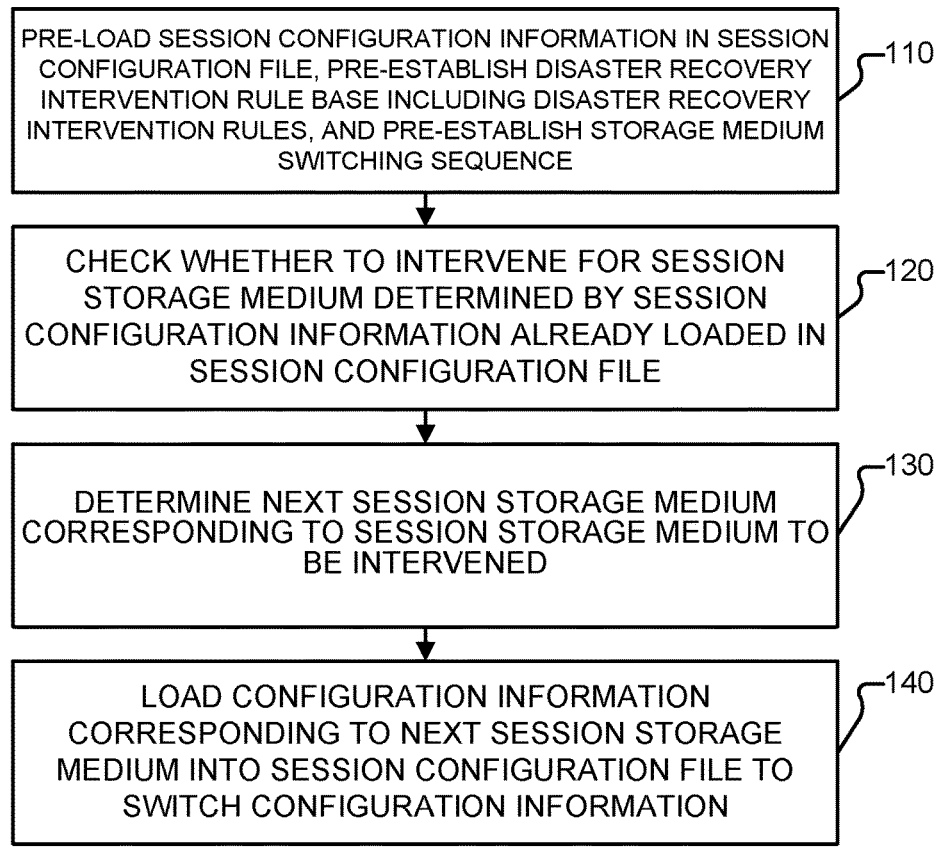
FIG. 1 is a flowchart of an embodiment of a process for session disaster recovery.

FIG. 1 is a flowchart of an embodiment of a process for session disaster recovery. In some embodiments, the process 100 is performed by a device 300 of FIG. 3 executing a session access application 210 of FIG. 2A and comprises:

In 110, the session access application pre-loads session configuration information in a session configuration file, pre-establishes a disaster recovery intervention rule base including disaster recovery intervention rules, and pre-establishes a storage medium switching sequence.

Any appropriate file format of the session configuration file can be used. For example, the file format of the session configuration file is in a .txt (text) format, XML (eXtensible Markup Language) format file, etc.

In some embodiments, the session configuration information includes session storage media types (e.g., cookie storage, memory storage, cache storage, persistent storage, or any combination thereof), storage address, form of encryption/decryption, and other such configuration information. In some embodiments, session data is stored based on type in different session storage media. For example, session data having higher security requirements is stored in persistent storage (such as, for example, a relational database), and session data having higher reading/writing speed requirements is stored in cookie storage. Therefore, in session configuration files, different types of session data can correspond to their respective session configuration information. For example, in a session configuration file, the session configuration information corresponds to a session ID (session identification, session unique identifier) used to identify session data or a hash value determined by the session ID (hash value corresponding to the session ID, for example, is calculated using a preset hashing algorithm).

As an aspect, the session configuration information can be used to determine an access strategy for accessing the session data. For example, the access strategy is determined by the content of the session configuration information, such as storage media type, storage address, form of encryption/decryption, etc. For example, the access strategy determined by the session configuration information includes: form of access channel to the session storage medium, as determined by the session storage medium type; access address as determined by the storage address; encryption or decryption algorithm for the session data, as determined by the form of encryption/decryption, etc. Examples of access channels include various types of network protocols such as a hypertext transfer protocol (HTTP) or a File Transfer Protocol (FTP). Various encryption or decryption algorithms are understood by one of ordinary skill in the art and are not to be further described for conciseness.

Various session storage media are described below.

Cookie storage: a cookie is a kind of exchange vehicle between a server and a client during browsing. The cookie is typically generated by the server and sent to the client. Typically, the main content of the cookie is user identity. The client stores the cookie locally in the file system of the client, and attaches the cookie when making a request to the server. Based on the cookie, the server is able to identify the user behind the request, which aids the server in performing queries. The usage of a cookie to store session data corresponds to cookie storage. One benefit of cookie storage is that cookie storage is highly available and can be shared by a cluster. However, because cookies are stored at the client, a risk of counterfeiting a cookie exists. Typically, important data is to be stored in encrypted form. In addition, the use of cookies to store session data also utilizes a certain amount of bandwidth.

Memory storage: session data can be stored in memory, such as the memory that supports the network application (e.g., random access memory (RAM) used to support the execution of the process). One of the benefits of memory storage is high access speed. However, in a website deployed as a cluster, memory of a single machine cannot be used by the cluster together. Consequently, the session data cannot easily be shared within the cluster. In addition, the memory capacity of a single machine is limited, thus how much memory can be used to store session data is limited.

Cache storage: the network provides separate caches to store session data, e.g., Memcache (distributed memory object caching system). One of the benefits of cache memory is that capacity of cache memory can be easily expanded and that the cache memory can be shared by clusters. However, cache memory is insufficiently stable. For example, data stored in the cache memory is lost as soon as the system crashes.

Persistent storage: session data can be stored in storage equipment capable of permanent preservation. An example of persistent storage includes a relational database stored to flash drives, storage disks, etc. One of the benefits of persistent storage includes security and support for cluster sharing. However, reading and writing speeds of persistent storage are relatively slow.

The above descriptions for several types of session storage media point out that different session storage media have different benefits and aspects. The several types of session storage media have well defined differences in their characteristics. Therefore, one can pre-establish a storage medium switching sequence and disaster recovery intervention rules based on the different characteristics of abnormalities that could occur in the storage media.

Any appropriate preset storage medium switching sequence is allowed. As an example, the preset storage medium switching sequence is as follows: in order of first to last, after the preceding storage medium has been checked and determined to require intervention, automatically switch to the next storage medium. For example, in the event that speed of access is one of the main considerations, the storage medium switching sequence is as follows: cookie storage>memory storage>cache storage>persistent storage. In another example, stability is one of the main considerations, thus the storage medium switching sequence is as follows: cookie storage>persistent storage>cache storage>memory storage. In yet another example, the storage medium switching sequence is as follows: cache storage>cookie storage.

In 120, in the event that a check trigger condition is satisfied for a disaster recovery intervention rule in the disaster recovery intervention rule base, the session access application automatically checks whether to intervene for the session storage medium determined by the session configuration information already loaded in the session configuration file. There are various types of disasters, for example, a cache memory crash. When the session access application detects a disaster, at least one check trigger condition is satisfied. In some embodiments, the checking is performed based on the disaster recovery intervention rule.

Any appropriate preset disaster recovery intervention rules can be used. For example, a check trigger condition corresponding to each disaster recovery intervention rule is set up in advance. In the event that a check trigger condition is satisfied, a checking process will be automatically triggered, and the session storage medium is to be checked based on a disaster recovery intervention rule corresponding to the check trigger condition. For example, the disaster recovery intervention rules in the disaster recovery intervention rule base include one or more of the following:

a) perform a heartbeat check on equipment including the session storage medium determined by the session configuration information already loaded in the session configuration file. In the event that the heartbeat check determines a failure has occurred, the equipment may have already crashed. Therefore, the session access application determines that an intervention is to be performed for the session storage medium included in the equipment having the heartbeat failure. A check trigger condition corresponding to this disaster recovery rule can trigger a check at the conclusion of each heartbeat period. In some embodiments, the equipment including the session storage medium periodically sends out a heartbeat message. If such a message is not received within a certain amount of time, then the session storage medium is deemed to have failed.

b) perform a process overload check, a thread overload check, or a combination thereof on the equipment including the session storage medium determined by the session configuration information already loaded in the session configuration file. These checks can be performed by making calls to the operating system of the equipment including the session storage medium using application programming interfaces (APIs) provided by an operating system vendor. In the event that an overload is determined, the overload indicates that equipment performance may have suddenly declined or crashed. Therefore, the overload determination indicates that an intervention is to be performed for the session storage medium corresponding to the overloaded equipment. The check trigger condition corresponding to this disaster recovery rule can trigger a check whenever a process, a thread, or a combination thereof accesses the equipment including the session storage medium.

c) perform a check on whether an access error has occurred in connection with the session data in the session storage medium, where the determination is made according to the session configuration information already loaded in the session configuration file. The error rate can be monitored by a system process and recorded as logs or other data formats. In the event that a determined error rate exceeds a threshold value, the determination can indicate that the equipment where the session storage medium is located has experienced an error or a sudden drop in performance. Therefore, a determination is made to perform an intervention for the session storage medium experiencing an error rate in excess of a threshold value. The check trigger condition corresponding to this disaster recovery intervention rule can trigger a check whenever access to the session data in the session storage medium involves an access error.

While rules a)-c) are discussed herein for purposes of example, other disaster recovery rules can be performed in other embodiments.

In 130, in the event that the check determines that an intervention is to be performed, the session access application determines the next session storage medium corresponding to the session storage medium that requires intervention based on the storage medium switching sequence.

In 140, the session access application loads the configuration information corresponding to the next session storage medium into the session configuration file to switch the configuration information corresponding to the session storage medium that requires intervention in the session configuration file to configuration information corresponding to the next session storage medium.

For example, in the event that the configuration information corresponding to the next session storage medium is loaded into the session configuration file, the session access application loads the configuration information corresponding to the next session storage medium into the session configuration file to replace the configuration information corresponding to the session storage medium that requires intervention. The configuration information corresponding to the session storage medium that requires intervention includes the session ID (or to a hash value determined by the session ID) corresponding to the configuration information corresponding to the session storage medium that requires intervention. For example, assuming that the session storage medium that requires intervention is cookie storage, the next session storage medium corresponding to cookie storage is memory storage. Assuming that the configuration information corresponding to cookie storage is expressed in an XML-formatted session configuration file as "<configuration information hash value="4"><storage type>cookie storage</storage type><storage address>client C:\Documents and Settings\Administrator Settings\Administrator\Local Settings\Temporary Internet Files</storage address><form of encryption>DES encryption</form of encryption></configuration information>." Assuming that the storage type in the configuration information corresponding to memory storage is memory storage, the storage address is memory of network designated machine 001, and form of encryption is unencrypted. Thus, after the configuration information corresponding to cookie storage in the session configuration file is switched or translated to configuration information corresponding to memory storage, the above configuration information in the configuration file is to be switched or translated to the next set of configuration options in the files, namely modifying the configuration file with the following information "<configuration information hash value ="4"><storage type>memory storage</storage type><storage address>network designated machine 001</storage address><form of encryption>none</form of encryption></configuration information>."

In some embodiments, the configuration information corresponding to the next session storage medium is to be generated in real time during loading or is generated in advance and stored for direct use in the event that the configuration information corresponding to the next session storage medium is to be loaded.

In some embodiments, the process 100 is applied as follows: one of the objectives of monitoring session storage media for abnormalities is achieved because a switching sequence is established in advance between different session storage media, and because the session storage medium determined by the session configuration information is automatically checked based on disaster recovery intervention rules in the event that a check trigger condition is met. Thus, in the event that an abnormality occurs in the session storage medium determined by the configuration information, the next session storage medium corresponding to the session storage medium that requires intervention is determined based on a preset switching sequence between different session media. The configuration information corresponding to the next session storage medium is loaded into the configuration file to cause the configuration information corresponding to the session storage medium that requires intervention in the configuration file to switch to the configuration information corresponding to the next session storage medium. This is the equivalent of automatically switching to configuration information corresponding to the next, abnormality-free session storage medium in the event that an abnormality occurs in the session storage medium corresponding to the configuration information in the configuration file. Thus, continued and stable access to the session data of the session storage medium determined by the session configuration information is insured.

In some embodiments, e.g., in the event that the administrator foresees a possibility of an abnormality occurring in a certain storage medium following a period of time or in the event that a determination is made that there are other reasons that a storage medium is to be adjusted, direct manual intervention can be performed. Therefore, in some embodiments, receiving an intervention request input by a user, generating configuration information corresponding to the intervention request, and loading the configuration information corresponding to the intervention request into a session configuration file are possible. The loading of the configuration information corresponding to the intervention request into the session configuration file can include: directly adding the configuration information corresponding to the intervention request to the session configuration file or loading the configuration information corresponding to the intervention request to the session configuration file to replace certain designated session configuration information in the session configuration file.

Figure 2A:
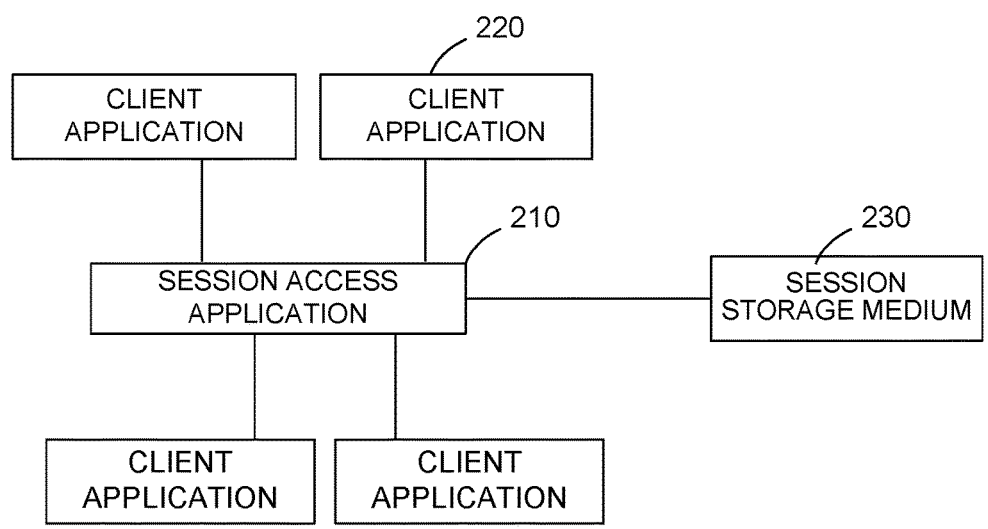
FIG. 2A is a diagram of an embodiment of a system for session disaster recovery.

FIG. 2A is a diagram of an embodiment of a system for session disaster recovery. In some embodiments, the system 200 includes a client application 220, a session access application 210 which is independent from the client application 220, and a session storage medium 230. In some embodiments, the session access application 210 is a separate application from the client application 220. The client application issues a session access request. In some embodiments, the client applications are applications to purchase products, chat, and supply comments with respect to a particular e-commerce platform, and the session access application is a separate application that interacts with the client applications. In some embodiments, the session access application 210 and the client application 220 are located on different devices. In some embodiments, the session access application 210, the client application 220, and the session storage medium 230 are located on the same device.

Figure 2B:
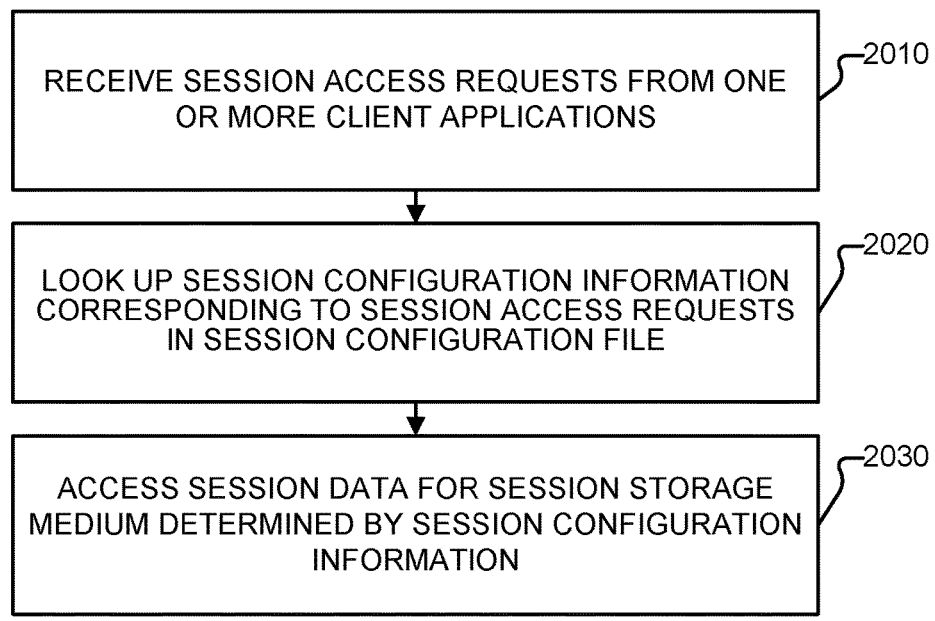
FIG. 2B is a flowchart of another embodiment of a process for session disaster recovery.

FIG. 2B is a flowchart of another embodiment of a process for session disaster recovery. In some embodiments, the process 2000 is performed by the session access application 210 of FIG. 2A and includes:

In 2010, the session access application receives session access requests from one or more client applications 220.

In 2020, the session access application accordingly looks up session configuration information corresponding to the session access requests in the session configuration file.

In 2030, the session access application accesses session data for the session storage medium 230 determined by the session configuration information. In some embodiments, the session access application 210, for example, receives session access requests from one or more client applications, and looks up session configuration information corresponding to the session access requests in a session configuration file. For example, upon receiving a session access request from another client application 220, the session access application 210 extracts a session ID (session identification, session unique identifier) from the access request, calculates a hash value corresponding to the session ID based on a preset hashing algorithm, and looks up configuration information corresponding to the calculated hash value in the session configuration file.

Based on an access strategy determined by the session configuration information corresponding to the session access requests, the session access application 210 accesses session data for the session storage medium determined by the session configuration information corresponding to the session access requests.

In some embodiments, the session access request from the client application includes reading access, writing access, or a combination thereof of the session data corresponding to the client application. In the event that a determination is made based on an access request that relevant session data is to be fed back to the client application, the client application can include feeding back to the client application relevant session data for reading access, writing access, or a combination thereof.

In some embodiments, other clients are not to be concerned with any related process after the session access request is issued. When an abnormality occurs or is about to occur in the session storage medium, the above system can automatically detect the session storage medium that requires intervention, and automatically switch the configuration information corresponding to the session storage medium that requires intervention in the session configuration file to the configuration information corresponding to the next normal session storage medium. The session configuration information in the session configuration file is relied on to determine the access strategy for continued, stable access of session data. Therefore, the other client applications are completely unaware of the session data access process and of switching that result from session storage medium abnormalities. This system can increase the efficiency of other client applications.

In addition, redundant storage media and synchronously transfer session data can be set up with higher security requirements into redundant storage media to ensure that, after the system switches from a session storage medium with an abnormality, the involved session data is found in the redundant storage medium, thus ensuring that no important session data is lost. Information such as the redundant storage medium type, storage address, and form of encryption/decryption can be stored in a session configuration file, and the like. In the event that session data writing access is received from the session access application, session data writing access is synchronously provided to the redundant storage medium.

Figure 3:
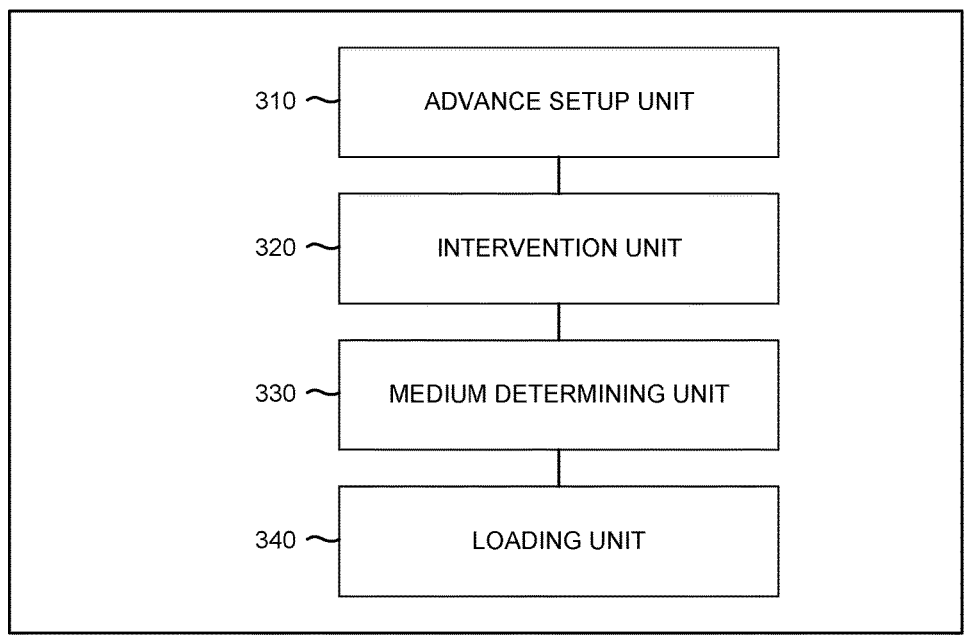
FIG. 3 is a structural diagram of an embodiment of a device for session disaster recovery.

FIG. 3 is a structural diagram of an embodiment of a device for session disaster recovery. The device 300 is configured to perform the process 100 and includes an advance setup unit 310, an intervention unit 320, a medium determining unit 330, and a loading unit 340. In some embodiments, the device 300 further includes a session storage medium (not shown).

In some embodiments, the advance setup unit 310 pre-loads session configuration information into a session configuration file, pre-establishes a disaster recovery intervention rule base including disaster recovery intervention rules, and pre-establishes a storage medium switching sequence.

In some embodiments, the intervention unit 320, when a check trigger condition is satisfied for a disaster recovery intervention rule in the disaster recovery intervention rule base, automatically checks, based on the disaster recovery intervention rule, whether intervention is to be performed for the session storage medium determined by the session configuration information already loaded in the session configuration file.

In some embodiments, the medium determining unit 330, in the event that the check determines that intervention is to be performed, determines a next session storage medium corresponding to the session storage medium to be intervened based on the storage medium switching sequence.

In some embodiments, the loading unit 340 loads configuration information corresponding to the next session storage medium into the session configuration file to switch the configuration information corresponding to the session storage medium that requires intervention in the session configuration file to the configuration information corresponding to the next session storage medium.

In some embodiments, the device 300 is applied as follows: session storage media is monitored for abnormalities because a switching sequence is established in advance by the advance setup unit 310 between different session storage media, and because the session storage medium determined by the session configuration information is automatically checked by the intervention unit 320 based on disaster recovery intervention rules in the event that a check trigger condition is met. Thus, when an abnormality occurs in the session storage medium determined by the configuration information, the next session storage medium corresponding to the session storage medium that requires intervention is determined by the medium determining unit 330 based on a preset switching sequence between different session storage media. Configuration information corresponding to the next session storage medium is loaded by the loading unit 340 into the configuration file to cause the configuration information corresponding to the session storage medium that requires intervention in the configuration file to switch to the configuration information corresponding to the next session storage medium. This device performs automatically switching to configuration information corresponding to the next, abnormality-free session storage medium when an abnormality occurs in the session storage medium corresponding to the configuration information in the configuration file. Thus, the device ensures continued and stable access to the session data of the session storage medium determined by the session configuration information.

No restriction exists regarding the storage medium switching sequence pre-established by the advance setup unit 310. For example, the advance setup unit 310 pre-sets the storage medium switching sequence to: cookie storage, memory storage, cache storage, persistent storage, or cookie storage, persistent storage, cache storage, memory storage.

No restriction exists regarding the disaster recovery intervention rules pre-established by the advance setup unit 310. For example, the advance setup unit 310 sets up in advance the disaster recovery intervention rules in a disaster recovery intervention rule base. The rules include at least one of the following: performing a heartbeat check on the equipment including the session storage medium determined by the session configuration information already loaded in the session configuration file; in the event that a determination that a heartbeat failure has occurred, determining whether to perform an intervention for the session storage medium corresponding to the equipment having the heartbeat failure; performing a process overload check, a thread overload check, or a combination thereof on the equipment including the session storage medium determined by the session configuration information already loaded in the session configuration file; in the event that an overload is determined, determining the intervention to be performed on the session storage medium corresponding to the equipment having the overload; performing a check on whether an access error has occurred in connection with the session data in the session storage medium determined by the session configuration information already loaded in the session configuration file; and in the event that the determined error rate exceeds a threshold value, determining that the session storage medium having the error rate in excess of a threshold value requires intervention.

Figure 4:
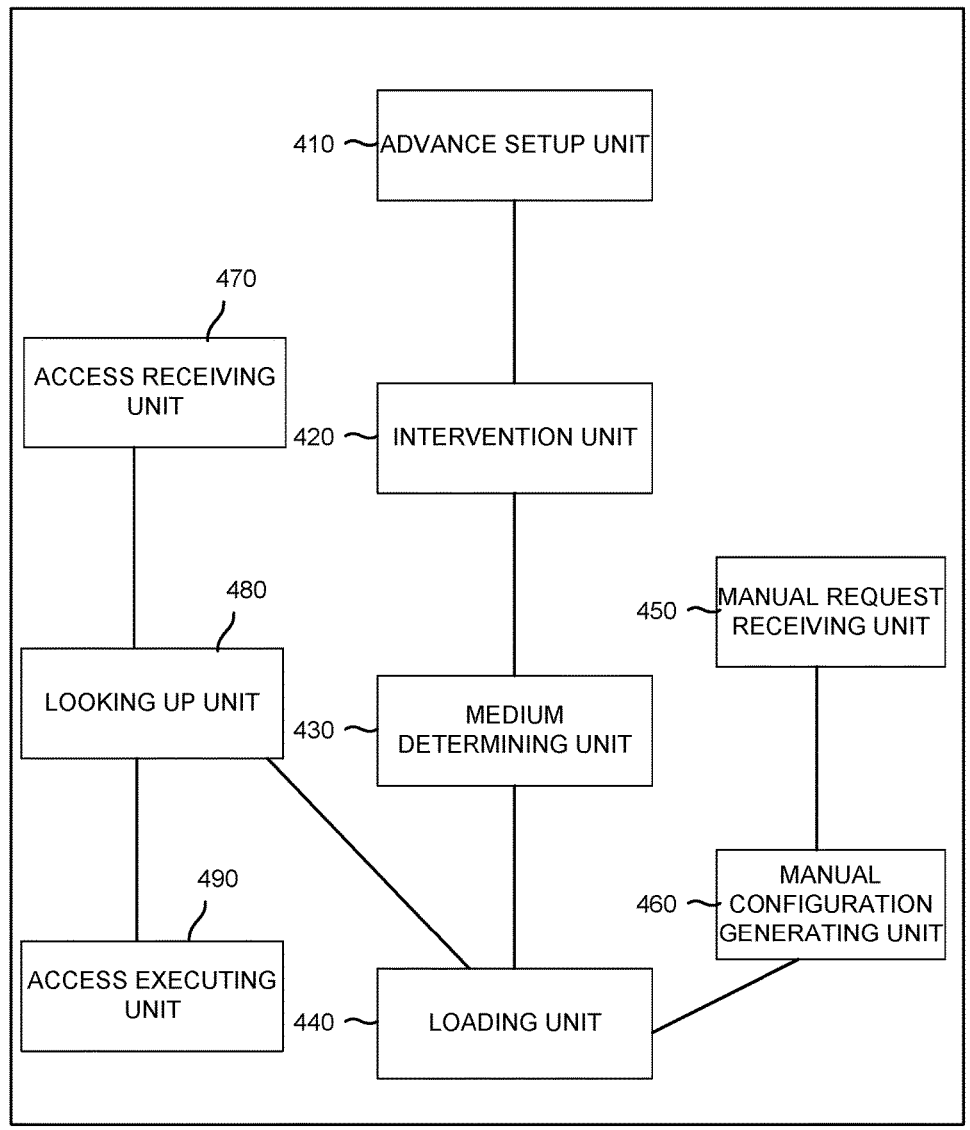
FIG. 4 is a structural diagram of another embodiment of a device for session disaster recovery.

FIG. 4 is a structural diagram of another embodiment of a device for session disaster recovery. In some embodiments, the device 400 is configured to implements the process 2000 of FIG. 2B and comprises: an advance setup unit 410, an intervention unit 420, a medium determining unit 430, and a loading unit 440. In some embodiments, the device 400 further includes a session storage medium (not shown).

The advance setup unit 410, the intervention unit 420, the medium determining unit 430, and the loading unit 440 correspond with the advance setup unit 310, the intervention unit 320, the medium determining unit 330, and the loading unit 340 of FIG. 3, respectively, and will not be further described for conciseness.

In some embodiments, the device 400 further comprises: a manual request receiving unit 450 and a manual configuration generating unit 460.

In some embodiments, the manual request receiving unit 450 receives intervention requests input by users.

In some embodiments, the manual configuration generating unit 460 generates configuration information corresponding to the intervention request.

In some embodiments, the loading unit 440 further loads the configuration information corresponding to the intervention request into the session configuration file.

In this implementation, manual intervention can be performed when an administrator foresees possibilities of abnormalities occurring in a certain storage medium following a period of time or when for other reasons a determination is made that a storage medium is to be adjusted.

In another implementation, the device 400 further comprises: an access receiving unit 470, a looking up unit 480, and an access executing unit 490.

In some embodiments, the access receiving unit 470 receives session access requests from one or more client applications.

In some embodiments, the looking up unit 480 obtains the session configuration file from the loading unit 440 and looks up session configuration information corresponding to the session access requests in the session configuration file.

In some embodiments, the access executing unit 490, based on an access strategy determined by the session configuration information corresponding to the session access requests, accesses session data for the session storage medium determined by the session configuration information corresponding to the session access requests.

When this implementation is applied, other client applications are not to be concerned with any relevant process following the issuance of the session access request. For example, the other client applications are completely unaware of the session data access process and of switching that result from session storage medium abnormalities. This implementation can increase the efficiency of the other client applications.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple subunits.

Figure 5:
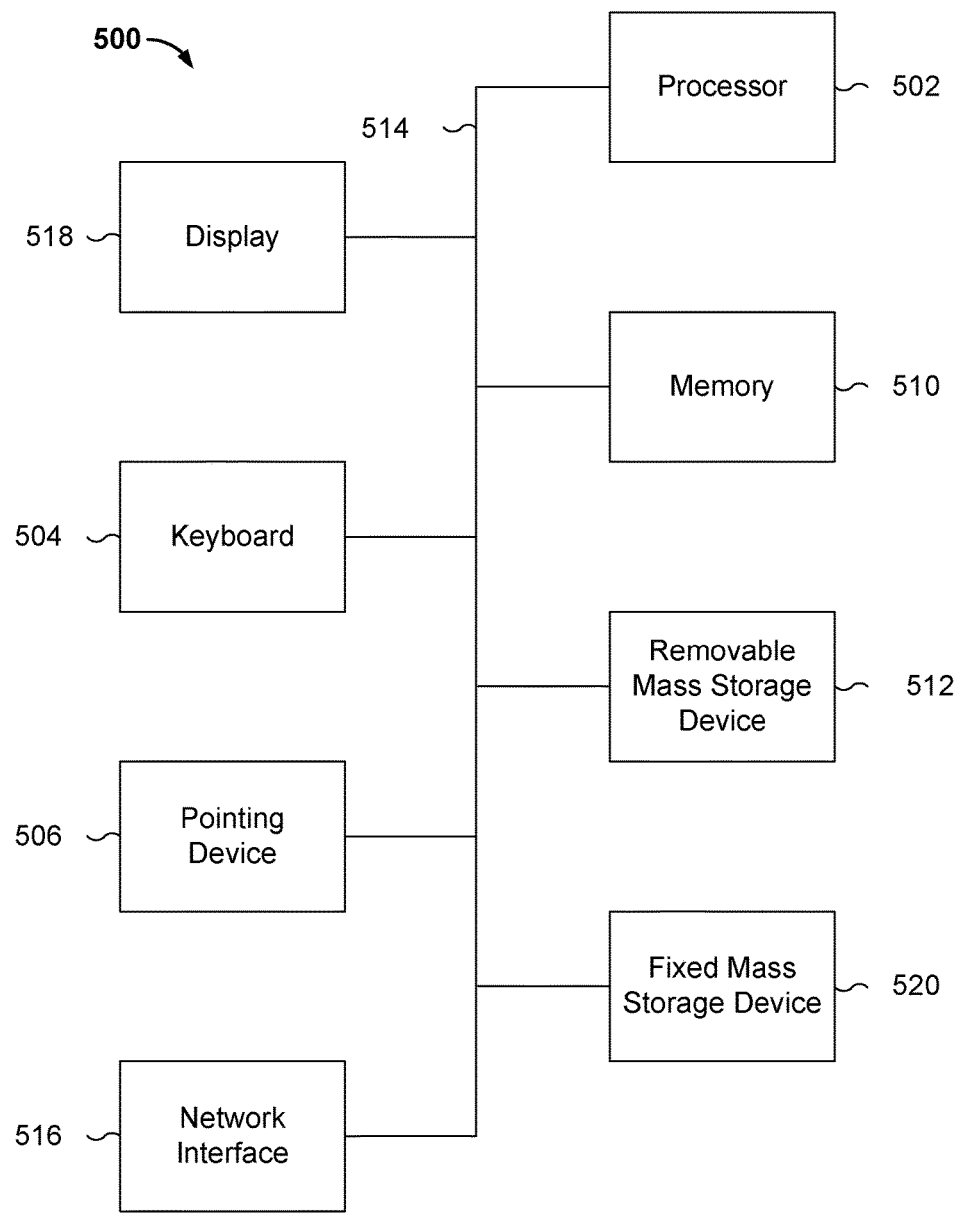
FIG. 5 is a functional diagram illustrating an embodiment of a programmed computer system for session disaster recovery.

FIG. 5 is a functional diagram illustrating an embodiment of a programmed computer system for session disaster recovery. As will be apparent, other computer system architectures and configurations can be used to perform session disaster recovery. Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518).

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data, and objects used by the processor 502 to perform its functions (e.g., programmed instructions). For example, memory 510 can include any suitable computer-readable storage media, described below, depending on whether, for example, data access needs to be bi-directional or uni-directional. For example, processor 502 can also directly and very rapidly retrieve and store frequently needed data in a cache memory (not shown).

A removable mass storage device 512 provides additional data storage capacity for the computer system 500, and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storage 512, 520 generally store additional programming instructions, data, and the like that typically are not in active use by the processor 502. It will be appreciated that the information retained within mass storages 512 and 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized. The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    loading session configuration information in a session configuration file;
    determining a storage medium switching sequence;
    determining that an intervention is to be performed for a first session storage medium based at least in part on the session configuration information; and
    in response to determining that the intervention is to be performed, performing a switching sequence based at least in part on the storage medium switching sequence, wherein the switching sequence comprises a process associated with configuring a session with a second session storage medium.

2. The method of claim 1, wherein the determining the storage medium switching sequence includes storing the storage medium switching sequence.

3. The method of claim 1, further comprising determining a disaster recovery intervention rule base including disaster recovery intervention rules.

4. The method of claim 3, further comprising:
determining that a condition associated with the disaster recovery intervention rules is satisfied; and
in response to determining that the condition associated with the disaster recovery intervention rules is satisfied, determining whether the intervention is to be performed for the first session storage medium.

5. The method of claim 4, wherein the determining whether the intervention is to be performed based at least in part on the disaster recovery intervention rules.

6. The method of claim 3, wherein the determining of the disaster recovery intervention rule base includes storing the disaster recovery intervention rule and obtaining the disaster recovery intervention rule in connection with determining that the intervention is to be performed.

7. The method of claim 1, wherein the switching sequence comprises determining the second session storage medium based at least in part on the session configuration information loaded in the session configuration file.

8. The method of claim 1, wherein the switching sequence comprises loading configuration information corresponding to the second session storage medium in the session configuration file.

9. The method of claim 1, wherein the loading the configuration information corresponding to the second session storage medium comprises switching the configuration information corresponding to the first session storage medium with configuration information corresponding to the second session storage medium.

10. The method of claim 1, wherein the storage medium switching sequence includes an order through which storage mediums are switched, and the order from first to last corresponds to:
a) cookie storage, memory storage, cache storage, and persistent storage; or
b) cookie storage, persistent storage, cache storage, and memory storage.

11. The method of claim 1, further comprising determining a disaster recovery intervention rule base including one or more disaster recovery intervention rules, wherein the one or more disaster recovery intervention rules included in the disaster recovery intervention rule base includes:
a) performing a heartbeat check on equipment including a session storage medium determined based at least in part on the session configuration information loaded in the session configuration file; and
in response to a heartbeat failure being determined, determining whether to intervene for the session storage medium corresponding to the equipment having the heartbeat failure;
b) performing a process overload check, a thread overload check, or a combination thereof on equipment including the session storage medium determined based at least in part on the session configuration information loaded in the session configuration file; and
in response to an overload being determined, determining whether an intervention is to be performed for the session storage medium corresponding to the equipment having the overload;
c) performing a check on whether an access error has occurred in connection with session data in the session storage medium determined based at least in part on the session configuration information loaded in the session configuration file; and
in response to a determination that a determined error rate exceeds a threshold value, determining that the session storage medium having the error rate in excess of the threshold value requires intervention; or
d) any combination of a)-c).

12. The method of claim 1, further comprising:
receiving an intervention request input by a user;
generating configuration information corresponding to the intervention request; and
loading the configuration information corresponding to the intervention request into the session configuration file.

13. The method of claim 1, further comprising:
receiving session access requests from one or more client applications;
looking up session configuration information corresponding to the session access requests, the session configuration information being loaded in the session configuration file; and
in accordance with an access strategy determined based at least in part on the session configuration information corresponding to the session access requests, accessing session data for the session storage medium determined based at least in part on the session configuration information corresponding to the session access requests.

14. A device, comprising:
one or more processors configured to:
load session configuration information in a session configuration file;
determine a storage medium switching sequence;
determine that an intervention is to be performed for a first session storage medium based at least in part on the session configuration information; and
in response to determining that the intervention is to be performed, perform a switching sequence based at least in part on the storage medium switching sequence, wherein the switching sequence comprises a process associated with configuring a session with a second session storage medium; and
a memory coupled to the one or more processors and configured to provide the one or more processors with instructions.

15. A computer program product being embodied in a tangible non-transitory computer readable storage medium and comprising computer instructions for:
loading session configuration information in a session configuration file;
determining a storage medium switching sequence;
determining that an intervention is to be performed for a first session storage medium based at least in part on the session configuration information; and
in response to determining that the intervention is to be performed, performing a switching sequence based at least in part on the storage medium switching sequence, wherein the switching sequence comprises a process associated with configuring a session with a second session storage medium.

* * * * *